Figure 1:
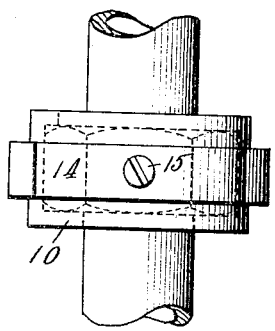

P. MUELLER & A. C. SCHUERMANN.
SEAL FOR PIPE COUPLINGS.
APPLICATION FILED JUNE 28, 1910.

1,039,576.

Patented Sept. 24, 1912.

Witnesses

Inventors
Philip Mueller
Anton C. Schuermann
By Meyers Cushman & Rea
Attorney

UNITED STATES PATENT OFFICE.

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

SEAL FOR PIPE-COUPLINGS.

1,039,576.  Specification of Letters Patent.  Patented Sept. 24, 1912.

Application filed June 28, 1910. Serial No. 569,378.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Seals for Pipe-Couplings, of which the following is a specification.

Our invention consists in the devising of a meter seal particularly adapted for use with gas meters, and the particular embodiment which we shall describe belongs to that type of meter seals in which use is made of an external covering for the union which connects the main to the meter, this covering being sealed on in such a manner that the union cannot be broken without first removing the cover through the breakage of the seal.

Although especially adapted for use with gas meters, and although the embodiment described relates to that type in which use is made of an external covering for unions, it will appear hereinafter that the invention may be applied to other kinds of meters, and to other kinds of connections and in other situations than that to which the specific embodiment described is adapted.

Many of the meter seals at present in use are objectionable in each of several respects. Most of them are relatively expensive to manufacture, and in case frequent renewals are necessary, owing to possible frequent trouble given by the meter, the expense involved in renewing the meter seals alone amounts to a considerable part of the total. Most of them too are applied by special tools or special sealing rivets are required, and the expense of providing this tool and the inconvenience of carrying it all the time when it is needed only a part of the time, are both items to be considered, as they amount to something in the long run. A plumber's kit is already heavy with the many heavy tools which are necessarily carried all the time, and the addition of special tools is to be avoided if possible. In most of the types of meter seals in use today too, use is made of a special form of lead seal, this lead seal usually being in the form of a rivet or key. These rivets or keys are broken when it is desired to break the seal, and enter the meter, and new ones have to be provided by the plumber. It has been found that these lead rivets are often duplicated by parties desiring to break the connection without authority, and that the seal is sometimes broken and made again with such skill, that the meter may have been tampered with a great number of times, and much gas may have been lost, before final detection by an authorized party.

It is the object of our invention to produce a less expensive device, to prodce a device which may be easily and quickly applied by ordinary tools already in the plumber's kit in a very short time, to produce a device which when sealed cannot be opened without breaking a part of the device itself, this part of the device constituting the seal, and being extremely difficult to duplicate. In short the objects of our invention are to overcome the difficulties above mentioned which are experienced with a great number of the meter seals at present in use, and to produce a seal which is inexpensive, easy of application, and most secure.

In the accomplishment of our invention we make use of a pair of semi-circular interiorly flanged incasing members, and a coöperating encircling clamping member or band provided with a special form of set screw. The semi-circular incasing members are made of such size and shape that they completely cover the union which connects the main to the meter, and are provided on their exterior surfaces with depressions for the accommodation of the encircling clamping member or band. This band constitutes the seal proper, and is made of a frangible metal and provided with portions so shaped as to enable the clamping member or band to be readily broken by a blow from a hammer or other heavy tool. This band is clamped into position around the semi-circular members by a set screw, this set screw being weakened at a point adjacent its head in such manner that the head is broken off after the clamp is securely placed, and the body of the set screw lies below the outer periphery of the clamping member. Thereafter the breaking of the seal necessitates the breaking of the encircling or embracing clamping member. The clamping member is made of such material and of such shape and form that it cannot be readily duplicated.

Our invention will be more readily understood from the following description of this specific embodiment, this description to be read in connection with the accompanying drawings which illustrate this embodiment.

Figure 2:
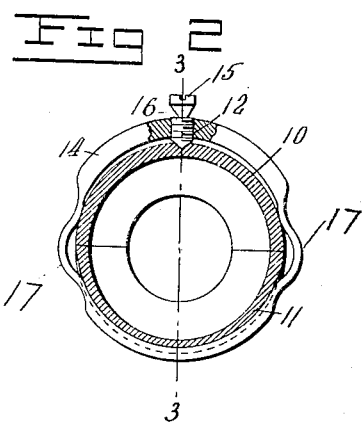
Figure 3:
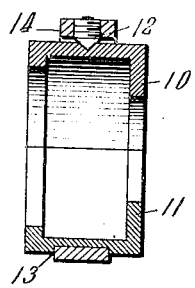
Figure 4:
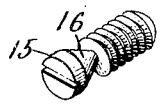

Of the drawings, Figure 1 is a plan view of our meter seal applied to the union of a gas main, this union connecting the gas main to the meter; Fig. 2 is a sectional elevation of the same free from the gas main showing the special form of set screw; Fig. 3 is a section on line 3—3 transversely of Fig. 2, and Fig. 4 is a perspective view of the special set screw or lock which we make use of.

Referring to the drawings, 10 and 11 are the two semi-circular members which are adapted to incase the union of the gas main or other connection to a meter. These members are interiorly flanged, for the proper incasing of the union, and are made from a common pattern being identically alike excepting for depressions which are subsequently formed in their outer surfaces. These depressions are simply formed during the finishing of the members. The depression in the member 10 is quite small and preferably circular. It is easily formed by a bur or drill. The depression on the other member 11 is quite extended, taking the form of an eccentric channel formed in the outer surface of this member and bounded by spaced side flanges or ribs. It is indicated at 13. Both depressions are preferably centrally located with respect to the members in which they are made.

14 is the encircling or embracing clamping member or band which is made from a frangible metal such as cast iron. As shown its internal diameter is such that it easily slips over the two semi-circular members when they are placed together and about a union. The depression in the member 11 is of sufficient width to accommodate it and it is clamped on the two members to secure them together by the special set-screw 15, the point of this set screw resting in the depression 12 in the member 10. This set-screw is provided with a head for driving with a screw-driver, and has a weakened portion 16 adjacent its head, this portion being of such strength that when the set-screw is screwed wholly home, further driving of the screw breaks off the head and leaves the body below the outer surface of the encircling member. Thereafter it is extremely impractical, and many times impossible to remove the set-screw, and remove the encircling clamping member in that manner. The embracing clamping member must be broken in order to remove it from the incasing members. To facilitate this breaking and make the embracing clamping member an ideal sealing member, we provide it on its opposite sides with sinuous or corrugated weakened portions 17 of reduced cross-section. The embracing clamping member may by this provision be easily broken by a blow from a hammer or other heavy tool, breaking the clamping member in two places, dividing it into two halves, and causing it to fall away from the incasing member and allow them to be removed from the union. This frangible clamping member cannot be readily repaired or duplicated, and it is thus possible to readily detect the tampering of unauthorized persons with the meter or its connections.

That we have obtained the object of our invention is thus apparent.

Our device is easy to manufacture, the semi-circular clamping members being made on an ordinary turret lathe from castings which are made from the same patterns. The embracing clamping member may be given sinuous or corrugated form, provided with weakened portions by so shaping the pattern from which the ring is cast, or by a simple milling operation.

The device is simply and easily applied by the use of the two most common and necessarily carried plumber's tools, a screw-driver and a hammer.

As the clamping member is made of iron or other suitable material, it can in no case be readily duplicated. Iron castings cannot be made and worked up with the same facility as can be the lead castings. Moreover considerable expense is entailed in duplicating one of these embracing members in case the sealing members are not made in large numbers. The cost of making four or five of these sealing members would be as prohibitive a factor as could be interposed. When made in large numbers in a properly equipped factory, however, they are comparatively inexpensive.

We desire to have it understood that our invention may be easily given other forms than those disclosed in this particular embodiment. We particularly desire to call attention to the fact that we may make the embracing clamping member which forms the seal of a material other than frangible metal. We may for instance make it of a malleable metal, of such ductility that the ring may be expanded by striking upon the weakened portions 17, and flattening them out. This expansion of the ring will remove it from the depressions formed in the incasing members, and allow it to be taken from them and allow the incasing members to be removed from the union. The degree of ductility given this embracing clamping member may be easily such that the member could not readily be given its old form. We also desire particularly to call attention to the fact that our invention may be used to seal together either two parts one with another to form a single device, or two devices one to another, as when it is desired to secure one device to another. And lastly we would call attention to the fact that the embracing clamping member or seal proper may be provided with monogrammic insignia of the gas or other light or power company as is now commonly the case where lead-rivets or sealing members are used.

What we claim is:—

1. A seal for couplings comprising two incasing members, one of which is provided with a depression in a portion of its periphery, a frangible sealing member which embraces said incasing members and is partly seated in said depression, and an irremovable means for fastening said sealing member around the incasing members.

2. A seal for couplings comprising two incasing members one of which members has a depression in a portion of its outer surface, a continuous sealing member of frangible material provided with a weakened portion which member embraces said incasing members and holds them together, a part of the body of said sealing member being seated in said depression, and an irremovable means associated with said sealing member and adapted to bear on the other of said members to retain the sealing member in said depression.

3. A seal for couplings comprising two incasing members, and a continuous, substantially annular sealing member which embraces them, said sealing member being provided with a weakened portion.

4. A seal for couplings comprising two incasing members, and a sealing member which embraces them, said sealing member having a sinuous portion of reduced cross section.

5. A sealing member comprising an unbroken rigid band of frangible metal having a weakened portion, and means for locking the same about the members to be sealed together.

6. A sealing member comprising a circular band of frangible metal having a weakened portion on each side, and means for locking the same about members to be sealed together.

7. A seal for couplings comprising a separable incasing member, a continuous inseparable sealing member of frangible material having a weakened portion which sealing member embraces the incasing member, an irremovable means for fastening the sealing member to the incasing member and the latter member around the coupling.

8. A seal for couplings comprising two incasing members, one of said members being provided with spaced ribs on a part only of its outer surface, and a frangible sealing member which embraces said incasing members a part of which said sealing member is seated between said ribs.

9. A seal for couplings comprising two incasing members, one of said members being provided with a channel in a portion of its outer surface the bottom of which channel is curved, and a frangible sealing member which embraces said member a portion of which sealing member is seated in the said channel.

10. A sealing member comprising a continuous integral band of frangible metal adapted to embrace the parts to be sealed together, and provided with an unbendable readily broken portion.

In testimony whereof we have hereunto set our hands in presence of two subscribing witnesses.

PHILIP MUELLER.
ANTON C. SCHUERMANN.

Witnesses:
W. R. GUSTIN,
W. R. BIDDLE.